United States Patent
Kim et al.

(10) Patent No.: US 12,055,677 B2
(45) Date of Patent: Aug. 6, 2024

(54) OPTICAL LAMINATE COMPRISING THERMOCHROMIC LAYER HAVING EXCELLENT OPTICAL PROPERTIES DUE TO CONTROL OF PHOTONIC EVAPORATION AND PHOTONIC SINTERING CONDITIONS, AND MANUFACTURING METHOD THEREFOR

(71) Applicant: KOREA INSTITUTE OF INDUSTRIAL TECHNOLOGY, Cheonan-si (KR)

(72) Inventors: Kwang Seok Kim, Jeonju-si (KR); Dae Up Kim, Yongin-si (KR); Seung Bae Son, Jeonju-si (KR); Ji Won Youn, Busan (KR); Eun Won Son, Daegu (KR)

(73) Assignee: KOREA INSTITUTE OF INDUSTRIAL TECHNOLOGY, Chungcheongnam-do (KR)

( * ) Notice: Subject to any disclaimer, the term of this patent is extended or adjusted under 35 U.S.C. 154(b) by 512 days.

(21) Appl. No.: 15/733,863

(22) PCT Filed: Sep. 21, 2018

(86) PCT No.: PCT/KR2018/011322
§ 371 (c)(1),
(2) Date: Nov. 30, 2020

(87) PCT Pub. No.: WO2020/059922
PCT Pub. Date: Mar. 26, 2020

(65) Prior Publication Data
US 2021/0223439 A1 Jul. 22, 2021

(51) Int. Cl.
*G02B 1/04* (2006.01)
*B05D 3/06* (2006.01)
(Continued)

(52) U.S. Cl.
CPC ............... *G02B 1/115* (2013.01); *B05D 3/06* (2013.01); *B22F 3/10* (2013.01); *C08J 5/18* (2013.01);
(Continued)

(58) Field of Classification Search
CPC .... G02B 1/04; G02B 1/115; C08J 5/18; C08J 7/06; B82Y 20/00; B22F 3/10
See application file for complete search history.

(56) References Cited

U.S. PATENT DOCUMENTS

2012/0026574 A1* 2/2012 Bae ............... C03C 17/3417
427/586

FOREIGN PATENT DOCUMENTS

JP 2008191748 A 8/2008
JP 2016188939 A 11/2016
(Continued)

OTHER PUBLICATIONS

"Nanoporous Thermochromic VO2 (M) Thin Films: Controlled Porosity, Largely Enhanced Luminous Transmittance and Solar Modulating Ability", Xun Cao, Ning Wang, Jia Yan Law, Say Chye Joachim Loo, Shlomo Magdassi, and Yi Long, Langmuir, 30, 1710-1715, (Year: 2014).*
(Continued)

*Primary Examiner* — Bijan Ahvazi
(74) *Attorney, Agent, or Firm* — CANTOR COLBURN LLP (57) ABSTRACT

The present invention provides an optical laminate, and a manufacturing method therefor, the optical laminate comprising a substrate and a thermochromic which is formed on the substrate and which comprises vanadium oxide particles, wherein the adhesive strength between the thermochromic layer and the substrate is 50 N/m or greater, and the thermochromic layer is controlled so as to have a specific
(Continued)

pore area ratio. The laminate manufactured by the method of the present invention has excellent visible light transmittance and infrared light transmittance.

7 Claims, 4 Drawing Sheets

(51) Int. Cl.
   *B22F 3/10* (2006.01)
   *C08J 5/18* (2006.01)
   *C08J 7/06* (2006.01)
   *G02B 1/115* (2015.01)
   *B32B 17/06* (2006.01)
   *B82Y 20/00* (2011.01)
   *B82Y 30/00* (2011.01)
   *B82Y 40/00* (2011.01)

(52) U.S. Cl.
   CPC .................. *C08J 7/06* (2013.01); *G02B 1/04* (2013.01); *B32B 17/06* (2013.01); *B82Y 20/00* (2013.01); *B82Y 30/00* (2013.01); *B82Y 40/00* (2013.01)

(56) References Cited

FOREIGN PATENT DOCUMENTS

| | | | |
|---|---|---|---|
| JP | 2016191016 A | 11/2016 | |
| KR | 1020120010857 A | 2/2012 | |
| KR | 1020130074157 A | 7/2013 | |
| KR | 1020130075920 A | 7/2013 | |
| KR | 101757324 B1 | 7/2017 | |
| WO | 2016017604 A1 | 2/2016 | |
| WO | 2016017611 A1 | 2/2016 | |
| WO | WO-2016017611 A1 * | 2/2016 | ............. C01G 31/02 |

OTHER PUBLICATIONS

Kwang-Seok Kim, Eun-Won Son, JiWon Youn, Dae Up Kim, Intense pulsed light sintering of vanadiumdioxide nanoparticle films and their optical properties for thermochromic smart window, Materials and Design 176 (2019) 107838 (Year: 2019).*
International Search Report mailed Jun. 18, 2019 for PCT/KR2018/011322. In conformance with MPEP 609—Concise explanation of the relevance includes issue date of OA and references cited therein.
Korean Office Action for KR Application No. 10-2018-0114151 mailed on Aug. 21, 2019.

* cited by examiner

OPTICAL LAMINATE COMPRISING THERMOCHROMIC LAYER HAVING EXCELLENT OPTICAL PROPERTIES DUE TO CONTROL OF PHOTONIC EVAPORATION AND PHOTONIC SINTERING CONDITIONS, AND MANUFACTURING METHOD THEREFOR

TECHNICAL FIELD

The present invention relates to an optical laminate including a thermochromic layer having excellent optical properties due to control of photonic evaporation and photonic sintering conditions.

BACKGROUND ART

Recently, there is an increasing need for the development of new alternative energy sources as the disadvantages of conventional coal, petroleum, or nuclear energy sources have emerged. However, it is equally important to adjust energy consumption. In fact, more than 60% of the energy consumption of general households is used for cooling and heating. In particular, the percentage of energy wasted through windows in general houses and buildings amounts to 24%. Therefore, in order to reduce energy wasted through windows, various efforts have been made, such as a method of adjusting the size of a window, a method of installing a highly insulating glass window, or the like.

For example, a thermochromic glass, which is obtained by coating glass with a thermochromic layer with thermochromism to adjust energy inflow by controlling infrared light transmittance, is being studied.

Thermochromism is a phenomenon in which the color of an oxide or sulfide of a certain transition metal reversibly changes at a transition temperature (or a critical temperature). By coating glass with such a thermochromic material, it is possible to manufacture a thermochromic glass in which visible light can enter above a certain temperature but near-infrared and infrared light are blocked to prevent an increase in indoor temperature. By using this feature, it is possible to shield near-infrared light at high temperatures in summer to suppress an increase in indoor temperature and to obtain light energy from the outside at low temperatures in winter. When such a thermochromic glass is used for windows and doors of buildings, great energy savings can be achieved.

A material exhibiting a thermochromic effect includes oxides or sulfides of various transition metals. Among the oxides and the sulfides, studies have been mainly conducted on the use of vanadium dioxide ($VO_2$) having a transition temperature (a phase transition temperature) of 68° C.

Korean Patent No. 10-1286170 describes a technique for coating a glass plate with vanadium dioxide using a sputtering deposition method, and Japanese Patent Application Laid-Open No. 2007-22838 describes a technique for coating a glass plate with vanadium dioxide using a chemical vapor deposition (CVD) process. However, conventional methods of coating a glass plate with vanadium dioxide, such as the sputtering deposition method and the CVD process, require a subsequent heat treatment process, require a long process time, and are not suitable for manufacturing large-area products. Also, due to a high-temperature heat-treatment process, there are great restrictions on the choice of material for a substrate to be coated with vanadium dioxide.

Meanwhile, Japanese Patent Application Laid-Open No. 2016-188939 discloses a method of forming an optical functional layer by dispersing vanadium dioxide-containing fine particles in a binder resin and applying the dispersion to a polymer substrate. However, it is difficult to uniformly disperse the particles in the polymer resin, and crystallinity is low because a sintering process is not performed. Thus, a light-blocking effect is not sufficient, and light transmission characteristics are degraded by the polymer resin.

DISCLOSURE

Technical Problem

The present invention is directed to providing an optical laminate that may be prepared to have a large area by a simple manufacturing process and that has optical features such as controlled visible and infrared light transmittance.

Technical Solution

In order to solve the problem, the present invention provides a substrate and a thermochromic layer formed on the substrate, wherein the thermochromic layer includes a vanadium oxide cluster, and the size of the vanadium oxide cluster is 20 to 250 nm.

Also, the thermochromic layer satisfies Equation 1 below:

$$1 \leq S(\%) \leq 20 \qquad \text{[Equation 1]}$$

where S is a pore area proportion measured by analyzing a picture obtained by a picture analysis apparatus capturing an upper surface of a sample.

Also, the present invention relates to a method of preparing an optical laminate including a substrate and a thermochromic layer formed on the substrate, wherein the thermochromic layer includes a vanadium oxide cluster, the method including a formation step of applying a solution containing vanadium oxide particles onto the substrate to form a coating layer, a photo-evaporation step of emitting light to remove organic matter from the coating layer, and a photo-sintering step of emitting light to photo-sinter the vanadium oxide particles contained in the coating layer to prepare a thermochromic layer including a vanadium oxide cluster.

Advantageous Effects

According to the present invention, it is possible to provide an optical laminate with controlled visible light transmittance and infrared light transmittance and a preparation method therefor in which the optical laminate can be prepared with a large area in a simple preparing process and in which there is no limitation on the type of a substrate on which a thermochromic layer is formed.

MODE OF THE INVENTION

The present invention relates to a laminate including a substrate and a thermochromic layer formed on the substrate, wherein the thermochromic layer includes a vanadium oxide cluster, the size of the vanadium oxide cluster is 20 to 250 nm, 40 to 220 nm, or 50 to 200 nm, and the thermochromic layer satisfies Equation 1.

$$1 \leq S(\%) \leq 20 \quad \text{[Equation 1]}$$

where S is a pore area proportion measured by analyzing a picture obtained by a picture analysis apparatus capturing an upper surface of a sample.

In the above, the term "vanadium oxide cluster" refers to an aggregate formed by removing an organic solvent from a solution containing vanadium oxide particles and causing consolidation of the vanadium oxide particles through a sintering process. Also, in the case of the thermochromic layer according to the present invention, when one face in contact with the substrate is a contact face and the other face is a surface on the basis of the cross-section of the thermochromic layer, the term "upper surface" in Equation 1 refers to the surface defined above.

The size of the cluster and the value of S are correlated with each other. In particular, the value of S decreases when the size of the cluster increases and increases when the size of the cluster decreases. When the values are controlled within the range, it is possible to control visible light transmittance and infrared light transmittance.

For example, it is difficult to control the infrared light transmittance when the size of the cluster is less than or equal to 20 nm, for example, less than 30 nm, less than 40 nm, less than 50 nm, or less than 100 nm, and it is difficult to obtain the visible light transmittance when the size of the cluster is more than 250 nm, for example, more than 240 nm, more than 230 nm, more than 210 nm, more than 190 nm, or more than 150 nm. Also, it is difficult to obtain the visible light transmittance when the value of S is less than 1%, for example, less than 2%, less than 3%, or less than 5%, and it is difficult to control the infrared light transmittance when the value of S is more than 20%, more than 18%, more than 16%, or more than 15%. The value of S may be measured by a known method by means of a picture capturing apparatus such as an electron microscope (scanning electron microscope (SEM)) and a picture analysis apparatus (software (S/W/)) for analyzing pictures obtained by the picture capturing apparatus. For example, the picture analysis apparatus may use software such as Image J, which can specify a pore by determining the contrast ratio of an image captured using the picture capturing apparatus such as FE-SEM and which can calculate the area of the pore. The apparatuses and software are known to those skilled in the art. Also, the size of the cluster may be measured by deriving the average of the maximum length and the minimum length of the cluster according to the ratio of a scale bar on an image using the picture capturing apparatus such as FE-SEM. In this case, software such as Image J may be used.

The present invention is prepared by applying a composite solution containing vanadium oxide onto a substrate, removing most organic matter (e.g., solvent) present in the composition solution through evaporation and sintering steps, and simultaneously sintering vanadium dioxide, and therefore it is possible to provide a thermochromic layer with excellent thermochromic effect and optical properties. When a thermochromic layer is prepared using a conventional gas phase method such as sputtering or chemical vapor deposition (CVD), a desired thermochromic effect and optical properties cannot be obtained.

In particular, the value of S and the size of the cluster in the thermochromic layer may be controlled through the content of dispersant and binder in the solution, the average diameter of particles, the thickness of a thin film, specific conditions for light emission, etc. The optical laminate according to the present application may form a thermochromic layer satisfying the above-described physical properties without limitation on a substrate by controlling specific conditions of evaporation and sintering to be described below.

In particular, since the evaporation and sintering processes involve high-temperature heat, a substrate may be physically deformed when the substrate is vulnerable to heat. For example, when a thermochromic layer is formed on a polymer film, deformation may occur on the film due to heat generated during evaporation and sintering. Accordingly, when a heat-sensitive substrate such as a polymer film is used, it is important to establish specific conditions for evaporation and sintering so that a thermochromic layer satisfies the above-described physical properties without causing physical deformation of the polymer film. This will be described in detail below.

The thickness of the thermochromic layer is not particularly limited and may be 0.1 to 5 μm. In detail, in a step of applying a solution onto a substrate to form a coating layer, the thickness of the thermochromic layer may be adjusted according to the number of times the solution is applied, i.e., in the range of 400 to 1000 nm when the coating is performed once and in the range of 600 to 900 nm when the coating is performed twice.

The laminate may have the maximum transmittance ($P_{max}$) of 50% or more, 55% or more, 60% or more, or 65% or more in the range of 400 nm to 800 nm and may have the minimum transmittance ($OP_{min}$) of 70% or less, 60% or less, in particular, 55% or less, 50% or less, or 40% or less in the range of 2000 to 3000 nm at any temperature higher than a critical temperature. When the $P_{max}$ value is 50% or more, the visible light transmittance is high and thus a transparent field of view can be secured. When the $OP_{min}$ value is 65% or less, the infrared blocking effect is excellent.

Also, the optical laminate may satisfy, for example, the conditions of Equation 2.

$$\Delta IR = BP_{min} - OP_{min} \geq 20\% \quad \text{[Equation 2]}$$

where $BP_{min}$ is the minimum transmittance in the range of 2000 to 3000 nm at any temperature lower than or equal to the critical temperature, and $OP_{min}$ is the minimum transmittance in the range of 2000 to 3000 nm at any temperature higher than or equal to the critical temperature. Here, the temperature lower than the critical temperature may be, for example, 20 to 30° C., in particular, 25° C., and the temperature higher than the critical temperature may be, for example, 60 to 90° C., in particular, 80° C. When ΔIR value (%) is more than 10%, in particular, 20%, 25%, 30%, or 35%, infrared blocking/transmission effects are excellent.

Also, the present invention relates to an optical laminate with an adhesive strength of 50 N/m or more, for example, 60 N/m or more, 70 N/m or more, 100 N/m or more, 120 N/m or more, or 150 N/m or more between the thermochromic layer and the substrate. The upper limit of the adhesive strength is not particularly limited and may be, for example, 250 N/m or less or 300 N/m or less. The term "adhesive strength" used herein refers to a value calculated by measuring a resistance value generated when a blade separates the thermochromic layer from the substrate, and specific conditions necessary for the measurement may refer to experimental examples.

The type of the substrate may be selected from a glass, quartz, or polymer film. In particular, when considering the utilization of a flexible apparatus, a polymer film may be selected as the substrate, and the type of the polymer film is not particularly limited, and a polyolefin film (e.g., cycloolefin, polyethylene, polypropylene, etc.), a polyester film (e.g., polyethylene terephthalate, polyethylene naphthalate), polyvinyl chloride, or a cellulose-based film (e.g., triacetyl cellulose) may be used.

In particular, the polymer film may include a polymer having a glass transition temperature of 70° C. or more, 80° C. or more, 90° C. or more, 100° C. or more, 110° C. or more, or 120° C. or more. As long as the glass transition temperature satisfies the range, the type is not particularly limited, and the selection may be appropriately performed in consideration of desired physical properties. For example, when the polymer film is a polyethylene naphthalate film, excellent heat resistance may be implemented.

Also, for example, the polymer film may be stretched about one or more axes and may have a shrinkage proportion of less than 3% when exposed at 120° C. for one hour. When the stretched polymer film is used, it is possible to have excellent mechanical strength and prevent shrinkage at high temperatures. A polymer film satisfying the conditions may be arbitrarily selected from among known materials and used.

The present invention also relates to a method of preparing an optical laminate using a solution containing vanadium oxide. The method of preparing the optical laminate includes a formation step of applying a solution containing vanadium oxide particles onto a substrate to form a coating layer, a photo-evaporation step of emitting light to remove organic matter from the coating layer, and a photo-sintering step of emitting light to photo-sinter vanadium oxide particles contained in the coating layer to prepare a thermochromic layer including a vanadium oxide cluster. The preparation method may be particularly effective when forming a thermochromic layer on a substrate made of a material sensitive to heat such as a polymer film is desired. The preparation method may include forming a thermochromic layer with controlled visible light transmittance and infrared transmission/blocking properties on a substrate without causing physical deformation of the substrate by emitting light through two steps (photo-evaporation step and photo-sintering step).

A composition solution containing vanadium oxide may include vanadium oxide particles, a solvent, a polymer dispersant, and a binder, wherein the polymer dispersant has a molecular weight of 10,000 to 360,000, and a viscosity of 1 to 100 cP, specifically 5 to 40 cP.

The molecular weight of the polymer dispersant that can be used in the present invention is 10,000 to 360,000, for example, 11,000 to 200,000, 12,000 to 100,000, or 15,000 to 70,000. When the molecular weight is within the above range, it is possible to secure excellent dispersibility and viscosity required to apply the composition solution onto the substrate.

The viscosity of the composition solution is 1 to 100, for example, 1 to 40, 5 to 30, 10 to 25, or 15 to 20. When the viscosity as well as the molecular weight of the polymer dispersant is adjusted to the above range, it is possible to satisfy the dispersibility of the particles and the conditions of the coating process.

The content of the polymer dispersant in the composition solution is, for example, 1 to 10 wt. %, and specifically, 2 to 8 wt. % or 3 to 7 wt. % with respect to the total weight of the composition solution. In order to control the visible light transmittance of the optical laminate and the crystallization of vanadium oxide, it is necessary to control the dispersant content within the above range.

The type of the polymer dispersant may include one or more materials selected from the group consisting of, for example, an amine-based polymer dispersant such as polyethylenimine and polyvinylpyrrolidone, a hydrocarbon-based polymer dispersant having a carboxylic acid group among molecules such as polyacrylic acid and carboxymethylcellulose, and a polymer dispersant having a polar group such as a copolymer having a polyethylenimine portion and a polyethylene oxide portion among polyvinyl alcohol, styrene-maleic acid copolymers, olefin-maleic acid copolymers, or a single molecule.

In an embodiment, as the polymer dispersant, a water-soluble polymer, specifically, an amine-based polymer, particularly, polyvinylpyrrolidone (PVP) may be used. When PVP is used, an aqueous solvent may be used, and thus it is possible to minimize environmental pollution even when preparing a large-area optical laminate because the aqueous solvent is environmentally friendly.

In the composition solution, the type of the binder is not particularly limited and includes one or more materials selected from the group consisting of, for example, a cellulose resin, a polyvinyl chloride resin, a polyvinyl alcohol resin, a polyvinylpyrrolidone resin, an acrylic resin, a vinyl acetate-acrylic acid ester copolymer resin, a butyral resin, an alkyd resin, an epoxy resin, a phenol resin, a rosin ester resin, a polyester resin, and a silicone resin.

The content of the binder is, for example, 0.1 to 3 wt. %, and specifically, 0.2 to 2 wt. % or 0.5 to 1.5 wt. % with respect to the total weight of the composition solution. The binder may not be completely dissolved in the solvent when the binder content exceeds 3 wt. %, and the adhesive strength between the binder and the substrate may be decreased when the binder content is less than 0.1 wt. %.

The type of the solvent is not particularly limited and includes one or more selected from among the group consisting of, for example, water, hydrocarbon solvent, chlorinated hydrocarbon solvent, cyclic ether solvent, ketone solvent, alcohol, polyhydric alcohol solvent, acetate solvent, ether solvent or terpene solvent of polyhydric alcohol. The type of the solvent may be appropriately selected depending on the polymeric binder and dispersant used, but in consideration of environmental factors, dispersion characteristics, and drying time, it is preferable to use a mixture of water and alcohol. Specifically, when considering wettability, it is preferable to use alcohol. The alcohol is not particularly limited, and an alcohol having a linear alkyl group having 2 to 6 carbon atoms, for example, ethanol, propanol, or butanol may be used. When considering the drying time, it is preferable to use ethanol with a low boiling point.

In this case, water and alcohol may be used after being mixed in the weight ratio of, for example, 1:0.5 to 1:1.5, specifically 1:0.7 to 1:1.3 or 1:0.8 to 1:1.2. When the weight ratio of water and alcohol is controlled within the range, the binder and the dispersant can be sufficiently dissolved, and an appropriate viscosity can be maintained.

The vanadium oxide particles may specifically include rutile-type vanadium dioxide (VO2) particles. The content of the vanadium dioxide particles is, for example, 1 to 50 wt. %, for example, 5 to 40 wt. %, 10 to 35 wt. %, or 15 to 30 wt. % with respect to the total weight of the solution composition. Also, the average diameter of the vanadium dioxide particles may be 1 to 1000 nm, for example, 10 to 500 nm. When the average diameter and the content of the vanadium dioxide particles are controlled within the above ranges, it is possible to obtain excellent thin film formation, uniform dispersibility, and desired functionality.

The composition solution may be prepared by mixing vanadium dioxide particles, a polymer dispersant, and a binder in a solvent and uniformly stirring. More specifically, the method includes preparing a polymer dispersant solution by mixing a polymer dispersant with a first solvent, preparing a binder solution by mixing a binder with a second solvent, and preparing an ink solution by mixing the polymer dispersant solution and the binder solution with vanadium dioxide particles and may arbitrarily or optionally include additionally mixing dopants with the mixture.

Ultrasonic waves may be applied to the solution for the purpose of uniform dispersion of the solution prepared in each step. As an example, the preparation method may further include one or more steps selected from the group consisting of the steps of applying ultrasonic waves to the polymer dispersant solution, applying ultrasonic waves to the binder solution, and applying ultrasonic waves to the ink solution. The ultrasonic application conditions are not particularly limited, and ultrasonic waves may be applied for 30 minutes to 2 hours in each step.

In the above step, a first solvent and a second solvent may be used without limitation as long as they are solvents capable of dissolving a dispersant and a binder, respectively. For example, water may be used as the first solvent, and ethanol may be used as the second solvent.

In the photo-evaporation step, most organic matter is removed through light emission. In the photo-sintering step, consolidation of vanadium oxide particles occurs due to light emission (neck growth). Thus, a vanadium oxide cluster is formed.

Meanwhile, the photo-evaporation step and the photo-sintering step involve high-temperature heat. Accordingly, when the substrate is made of a heat-sensitive material such as a polymer film, it is possible to prepare a thermochromic layer having desired physical properties without physical deformation of the polymer film by controlling specific conditions of the photo-evaporation step and the photo-sintering step, for example, the type of light, an applied voltage (an output voltage), a pulse width, the number of pulses (the number of times light is repeatedly emitted), a pulse interval (frequency). For example, the light may be white light applied from a xenon lamp, the voltage may be 1000 to 3000 V, the number of pulses may be 1 to 500, the pulse interval may be 1 to 10 Hz, and the pulse width may be 1 to 10 ms.

First, in the photo-evaporation step, as the number of pulses increases, the total energy increases to effectively remove the solvent. However, when the number of pulses is too high, the increase in the total energy may cause physical deformation of the polymer film. The total energy is determined by the output voltage, the pulse width, the pulse interval, and the number of pulses. The number of pulses may be, for example, 200 to 400, 250 to 350, or about 300.

As the pulse interval decreases, the average power applied per second increases, and thus the processing time may decrease. The average power is determined by the output voltage, the pulse width, and the pulse interval. However, the solvent may evaporate when the pulse interval is 1 Hz or more, and a bed temperature may rise rapidly to cause physical deformation of the polymer film when the pulse interval is less than 1 Hz.

Also, when the output voltage is increased, organic matter is effectively removed, but the polymer film may be physically deformed. An appropriate voltage at which no physical deformation occurs may be in the range of 1000 V to 1500 V, 1100 V to 1400 V, or 1200 V to 1300 V.

Also, as the output voltage increases, the concentration of organic matter (carbon or nitrogen) on a contact surface formed between the thermochromic layer and the substrate decreases. For example, the concentration of organic matter rapidly decreases at 1200 V, and the organic matter is first removed at 1100 V.

Meanwhile, the output voltage is associated with the visible light transmittance and infrared light transmittance of the laminate. When the voltage is increased, the polymer film is physically deformed, and the visible light transmittance is decreased. The infrared light transmittance increases at low voltages, for example, 1200 V, and decreases due to the formation of cracks in the thermochromic layer at 1400 V or more.

The photo-sintering step is a step of changing specific light emission conditions in the photo-evaporation step to photo-sintering conditions to be described below. Accordingly, the photo-evaporation step and the photo-sintering step may be continuously performed.

The output voltage of light in the photo-sintering step may be higher than the output voltage of light in the photo-evaporation step. The output voltage of light in the photo-sintering step should be selected such that the vanadium oxide particles are sintered but the substrate is not deformed. For example, the output voltage of light may be 1500 V to 3000 V, 1600 V to 2500 V, 1700 V to 1800 V, or about 1700 V.

Also, in the photo-evaporation step and the photo-sintering step, light is repeatedly emitted with a certain pulse width. The number of times light is repeatedly emitted in the photo-sintering step may be less than or equal to the number of times light is repeatedly emitted in the photo-evaporation step. In the photo-sintering step, as the number of emissions increases, the spacing between the vanadium oxide particles decreases, and thus a vanadium oxide cluster may be formed. In the photo-sintering step, as the number of emissions increases, the visible light transmittance and the infrared light transmittance increase, but when the number of emissions exceeds a certain number, the visible light transmittance and the infrared light transmittance decrease due to the deformation of the substrate. For example, the infrared light transmittance increases until the number of emissions reaches 200, and the visible light transmittance and the infrared light transmittance decrease when the number of emissions exceeds 250. Accordingly, it may be appropriate that the number of emissions in the photo-sintering step may be 50 to 300, 100 to 250, 150 to 200, or about 200.

Also, the pulse width of light in the photo-sintering step may be smaller than the pulse width of light in the photo-evaporation step. For example, the pulse width in the photo-evaporation step may be 1 to 10 ms, 2 to 8 ms, or 3 to 5 ms, and the pulse width in the photo-sintering step may be 0.1 to 5 ms, 0.5 to 3 ms, or 1 to 2 ms.

In the method of preparing the optical laminate according to the present invention, the coating layer may be formed by performing coating at least one or more times, for example, once, twice, or more. Specifically, when the coating layer is formed by performing coating twice, the formation step may include a first coating step of applying a solution onto a substrate and a second coating step of applying a solution onto a coating layer formed in the first coating step.

Also, it is preferable that the formation step should be performed by spin coating or spray coating. In an embodiment, the spin coating may be applying a solution by coating for a predetermined rotation speed and time. In the first coating step, spin coating may be performed at a first rotation speed during a first rotation time. In the second coating step, spin coating may be performed at a second rotation speed during a second rotation time. The first rotation speed and the second rotation speed are not particularly limited and may be, for example, 1000 to 10000 rpm, 2000 to 9000 rpm, 3000 to 8000 rpm, or 4000 to 7000 rpm. Also, the first and second rotation times may be 5 to 50 seconds. The number of coatings may affect a pore area proportion and a cluster size in the thermochromic layer. For example, when the number of coatings is one, a sintering effect is high, and the size of the cluster increases. However, due to a relatively low vanadium dioxide content, the pore area proportion may be high. On the other hand, when the number of coatings is two, the formation of the cluster is somewhat limited by the partial sintering of the particles, but the pore area proportion is low due to a relatively high vanadium dioxide content.

Also, a drying step may be performed after the coating steps. For example, the first coating step, a first drying step, the second coating step, and a second drying step are sequentially performed. The first drying step and the second drying step may be performed, for example, in the range of 60 to 100° C.

As one example, the photo-evaporation step and the photo-sintering step may be performed in an air atmosphere. When the photo-evaporation step and the photo-sintering step are performed in the air atmosphere, the proportion of vanadium oxide particles converted into $VO_2(R)$ phase having a thermochromic effect may be increased. Also, the atmosphere in the photo-evaporation step is associated with the removal of organic matter. For example, the concentration of oxygen in a chamber acts as a key factor to remove organic matter. In particular, when the steps are performed in an inert atmosphere such as nitrogen or argon or in a vacuum atmosphere, most organic matter is not removed, and thus the concentration of organic matter on the surface increases. The concentration of organic matter on the surface is associated with the infrared light transmittance. For example, the concentration of organic matter on the surface is higher in the order of the air atmosphere, the inert atmosphere, and the vacuum atmosphere, and the infrared light transmittance is lower in the order of the air atmosphere, the inert atmosphere, and the vacuum atmosphere.

The present invention will be described in detail with reference to embodiments. However, configurations illustrated in the embodiments and drawings described in the specification do not represent the technical spirit of the present invention but are just examples. Thus, it should be understood that there may be various equivalents and modifications which can replace the configurations at the time of filing this specification.

[Preparation of Coating Solution]

Preparation Example

A first solution was prepared by mixing PVP (having a weight molecular weight of 40,000) with 15 mL of water such that the PVP reaches 5 wt. % with respect to the total amount of ink solution. A second solution was prepared by mixing cellulose with 19.1 mL of ethanol such that the cellulose reaches 1 wt. % with respect to the total amount of ink solution. Ultrasonic waves were applied to the prepared solutions for one hour. In a nitrogen atmosphere, a coating ink solution was prepared by preparing 5 wt. % of VO2 particles with respect to the total amount of ink solution, mixing the VO2 particles with the first solution and the second solution, and applying ultrasonic waves to the mixture for one hour to prepare the coating ink solution.

[Preparation of Optical Laminate]

Embodiment 1

0.2 mL of the coating solution prepared in the above preparation example was applied onto a polyethylene naphthalate (PEN, glass transition temperature of 120° C.) substrate through a spin coating apparatus (ACE-200). Before the application, the PEN surface was treated in the oxygen atmosphere through an atmospheric pressure plasma apparatus (IDP-1000). The spin coating was carried out at 5,000 rpm for 30 seconds. A solvent was photo-evaporated from the coating layer using a light emission apparatus. In this case, for the photo-evaporation, white light applied from a xenon lamp was used, the applied voltage was 1210 V, the number of pulses was 300, the pulse width was 3 ms, the pulse interval was 1.0 Hz, and the air atmosphere was used for the sintering atmosphere. Then, the optical laminate having the thermochromic layer was prepared by changing the light emission conditions to the photo-sintering conditions and photo-sintering the vanadium dioxide of the coating layer on which the photo-evaporation was performed. For the photo-sintering, the applied voltage was 1740 V, the number of pulses was 200, the pulse width was 3 ms, the pulse interval was 1.0 Hz, and the air atmosphere was used for the sintering atmosphere.

Embodiment 2

An optical laminate was prepared in the same method as Embodiment 1 except that, for the photo-evaporation, the applied voltage was 1100 V and the pulse width was 4 ms.

Embodiment 3

An optical laminate was prepared in the same method as Embodiment 1 except that, for the photo-sintering, the number of pulses was 50.

Embodiment 4

An optical laminate was prepared in the same method as Embodiment 1 except that, for the photo-sintering, the number of pulses was 100.

Embodiment 5

An optical laminate was prepared in the same method as Embodiment 1 except that, for the photo-sintering, the number of pulses was 150.

Embodiment 6

An optical laminate was prepared in the same method as Embodiment 1 except that, for the photo-evaporation, the applied voltage was 1100 V, the number of pulses was 100, the pulse width was 4 ms, and the pulse interval was 1.0 Hz.

Embodiment 7

An optical laminate was prepared in the same method as Embodiment 1 except that, for the photo-evaporation, the applied voltage was 1100 V, the number of pulses was 200, the pulse width was 4 ms, and the pulse interval was 1.0 Hz.

Embodiment 8

An optical laminate was prepared in the same method as Embodiment 1 except that, for the photo-evaporation, the applied voltage was 1100 V, the number of pulses was 300, the pulse width was 4 ms, and the pulse interval was 0.9 Hz.

Embodiment 9

An optical laminate was prepared in the same method as Embodiment 1 except that spin coating was performed by performing first coating through rotation at 5000 rpm for 30 seconds, drying at 80° C. for 10 minutes, performing second coating through rotation at 5000 rpm for 30 seconds, and then drying at 80° C. for 10 minutes.

Comparative Example 1

An optical laminate was prepared in the same method as Embodiment 1 except that, for the photo-evaporation, the applied voltage was 1740 V and the pulse width was 1 ms.

Comparative Example 2

An optical laminate was prepared in the same method as Embodiment 1 except that, for the photo-evaporation, the applied voltage was 1390 V and the pulse width was 2 ms.

Comparative Example 3

An optical laminate was prepared in the same method as Embodiment 1 except that, for the photo-sintering, the number of pulses was 250.

Comparative Example 4

An optical laminate was prepared in the same method as Embodiment 1 except that, for the photo-evaporation, the applied voltage was 1100 V, the number of pulses was 400, the pulse width was 4 ms, and the pulse interval was 1.0 Hz.

Comparative Example 5

An optical laminate was prepared in the same method as Embodiment 1 except that, for the photo-evaporation, the applied voltage was 1100 V, the number of pulses was 400, the pulse width was 4 ms, and the pulse interval was 1.1 Hz.

Comparative Example 6

An optical laminate was prepared in the same method as Embodiment 1 except that, for the photo-evaporation, the applied voltage was 1100 V, the number of pulses was 400, the pulse width was 4 ms, and the pulse interval was 1.2 Hz.

For the optical laminate prepared in the above embodiments and the comparative examples, it was observed using an electron microscope (SEM) whether a cluster was generated, an external appearance was observed with naked eyes, and the observation results were shown in drawings.

Figure 1:
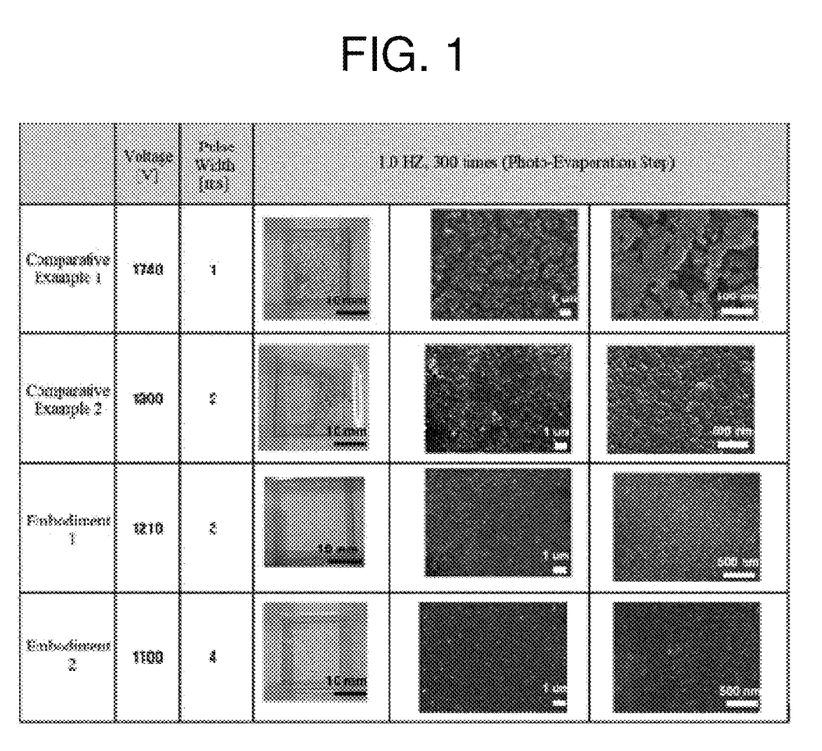
FIG. 1 is a diagram showing electron microscope images and external appearances of optical laminates prepared in Embodiment 1, Embodiment 2, Comparative Example 1, and Comparative Example 2.

FIG. 1 is a diagram showing the electron microscope images and external appearances of the optical laminates prepared in Embodiment 1, Embodiment 2, Comparative Example 1, and Comparative Example 2. Specifically, the embodiments and the comparative examples were classified by applying different voltages and pulse widths in the photo-evaporation step, and as a result, evaporation occurred more easily as the voltage increased. However, when a voltage of 1390 V or higher was applied (Comparative Examples 1 and 2), it could be seen that the PEN substrate was deformed.

Figure 2:
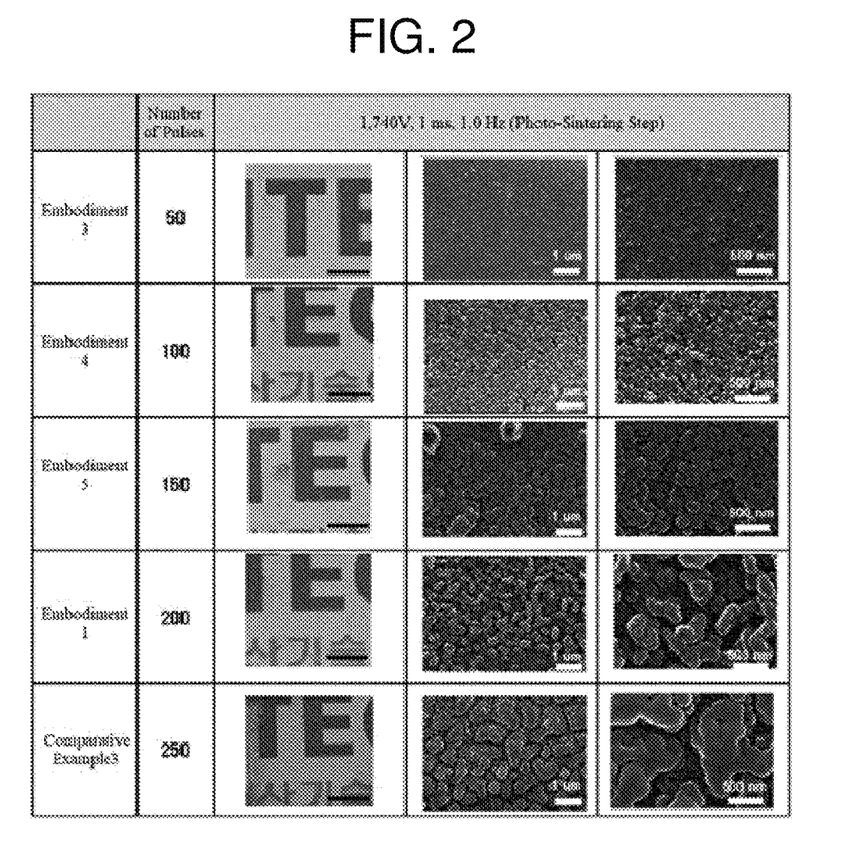
FIG. 2 is a diagram showing electron microscope images and external appearances of optical laminates prepared in Embodiment 1, Embodiment 3, Embodiment 4, Embodiment 5, and Comparative Example 3.

FIG. 2 is a diagram showing the electron microscope images and external appearances of the optical laminates prepared in Embodiment 1, Embodiment 3, Embodiment 4, Embodiment 5, and Comparative Example 3. Specifically, the embodiments and the comparative example were classified by applying different numbers of pulses in the photo-sintering step, and as a result, the size of the cluster increased as the number of pulses increased. However, when the number of pulses was 250 or more (Comparative Example 3), it could be seen that a portion of the PEN substrate was deformed.

Figure 3:
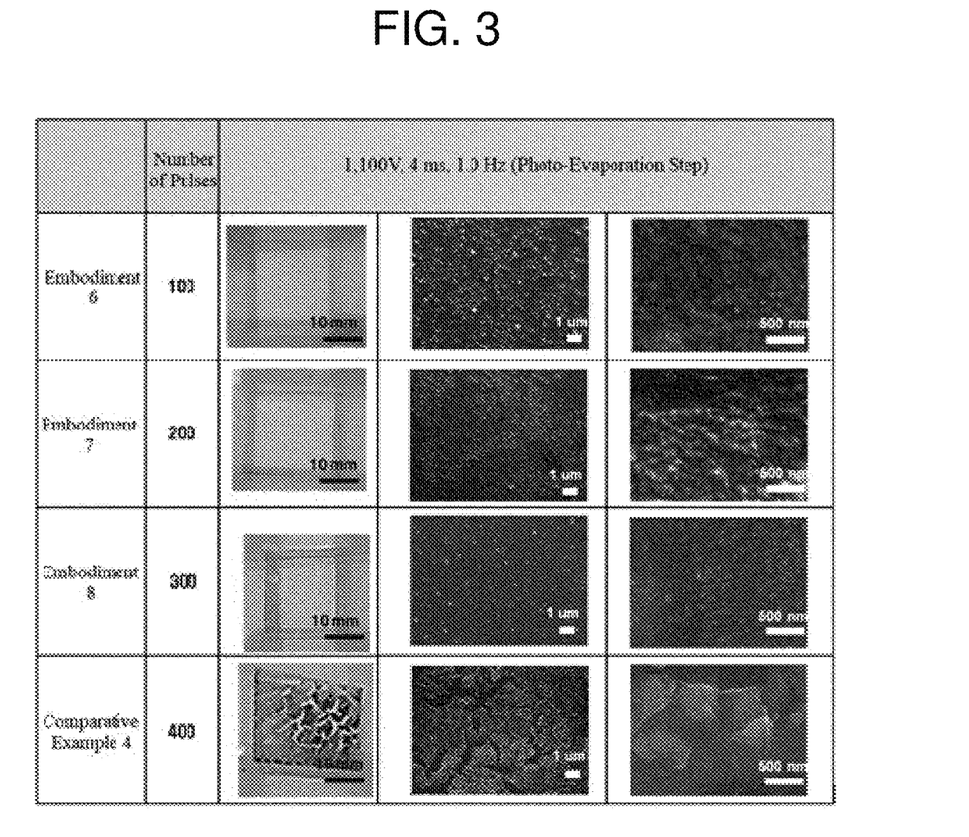
FIG. 3 is a diagram showing electron microscope images and external appearances of optical laminates prepared in Embodiment 6, Embodiment 7, Embodiment 2, and Comparative Example 4.

FIG. 3 is a diagram showing the electron microscope images and external appearances of the optical laminates prepared in Embodiment 6, Embodiment 7, Embodiment 2, and Comparative Example 4. Specifically, the embodiments and the comparative example were classified by applying different numbers of pulses in the photo-evaporation step, and as a result, evaporation further occurred as the number of pulses increased. However, when the number of pulses was 400 or more (Comparative Example 4), it could be seen that the PEN substrate was deformed.

Figure 4:
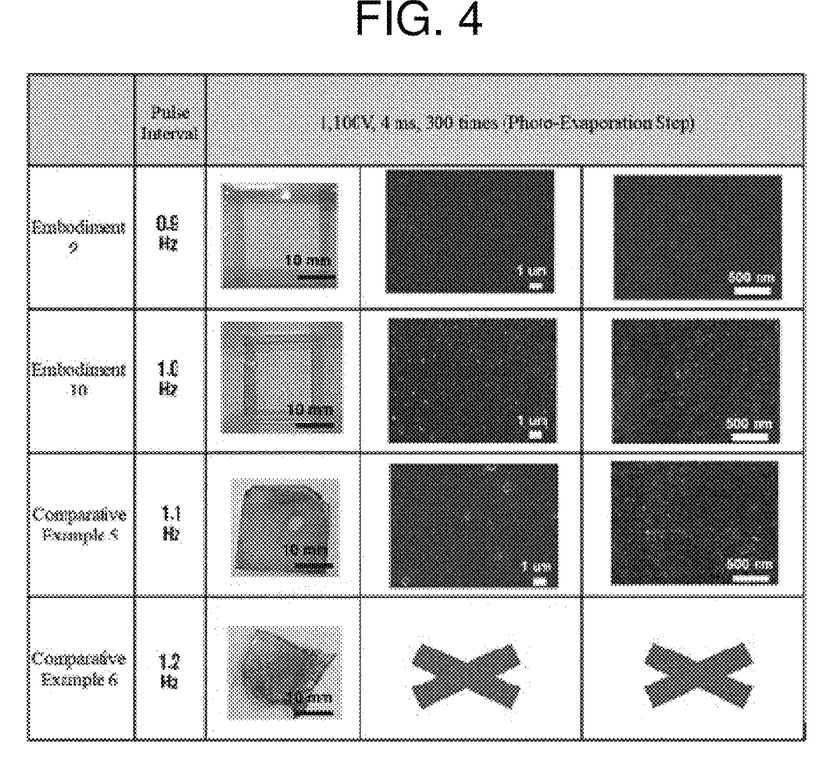
FIG. 4 is a diagram showing electron microscope images and external appearances of optical laminates prepared in Embodiment 8, Embodiment 2, Comparative Example 5, and Comparative Example 6.

FIG. 4 is a diagram showing the electron microscope images and external appearances of optical laminates prepared in Embodiment 8, Embodiment 2, Comparative Example 5, and Comparative Example 6. Specifically, the embodiments and the comparative examples were classified by applying different pulse intervals in the photo-evaporation step, and as a result, the photo-sintering processing time decreased as the pulse interval increased, and evaporation started above 1.0 Hz. Also, when the pulse interval was 1.1 Hz or more (Comparative Examples 5 and 6), it could be seen that the PEN substrate was deformed. In particular, even the removal of organic matter did not occur at 1.2 Hz (Comparative Example 6).

The results show that it is important to establish specific conditions of the photo-evaporation step and the photo-sintering step to prevent the substrate from being deformed.

[Transmittance of Optical Laminate]

Experimental Example 1

The transmittance of the optical laminate prepared in the embodiments according to the number of pulses in the photo-sintering was measured using a UV-VIS photometric system (scan rate 1 nm/sec), and the measurement result was shown in Table 1.

TABLE 1

|  | Number of Pulses in Photo-sintering | $P_{max}$ | $BP_{min}$ | $OP_{min}$ | Δ IR |
|---|---|---|---|---|---|
| Embodiment 1 | 200 | 67.4% | 56% | 30.5% | 25.5% |
| Embodiment 3 | 50 | 69.7% | 72.0% | 60.6% | 11.4% |
| Embodiment 4 | 100 | 68.4% | 56.0% | 36.5% | 19.5% |
| Embodiment 5 | 150 | 68.8% | 56.2% | 31.5% | 24.7% |
| Comparative Example 3 | 250 | 49.2% | 53.6% | 47.9% | 5.7% |

Remarks
$P_{max}$: Maximum transmittance in range of 200 to 800 nm,
$BP_{min}$: Minimum transmittance in range of 2000 to 3000 nm at 25° C.,
$OP_{min}$: Minimum transmittance in range of 2000 to 3000 nm at 80° C.,
Δ IR = ($BP_{min}$ − $OP_{min}$)

It could be seen that when the conditions for photo-evaporation and photo-sintering were specifically established for the PEN substrate, sintering is performed without physical deformation of the substrate to realize excellent visible light transmittance and infrared light transmittance. Meanwhile, the transmittance of the optical laminate in Embodiment 9 was measured, and the measurement result was shown in Table 2.

TABLE 2

|  | Spin Coating | $P_{max}$ | $BP_{min}$ | $OP_{min}$ | Δ IR |
|---|---|---|---|---|---|
| Embodiment 1 | 1 | 67.4% | 56% | 30.5% | 25.5% |
| Embodiment 9 | 2 | 60.4% | 51.8% | 19.7% | 32.1% |

From Table 2, when coating was performed twice, it could be seen that the thickness of the coating layer increased, the visible light transmittance decreased, and the infrared light transmittance increased due to a change in a microstructure of the coating layer.

[Measurement of Pore Area Proportion and Cluster Size]

Experimental Example 2

For the optical laminate prepared in the embodiments and the comparative examples, the pore area proportion and cluster size of the thermochromic layer were measured. In particular, an image obtained from FE-SEM was calculated using the program Image J, and the result was shown in Table 3 below.

TABLE 3

|  | Embodiments | | | | | | Comparative Examples | |
|---|---|---|---|---|---|---|---|---|
|  | 1 | 2 | 3 | 4 | 6 | 7 | 3 | 6 |
| Cluster Size (nm) | 31.15 | 26.87 | 22.23 | 112.89 | 29.43 | 31.27 | 429.37 | N/A |
| Pore Area Proportion | 3.10 | 9.85 | 5.35 | 7.02 | 4.39 | 9.35 | 15.78 | N/A |

In Comparative Example 6, organic matter was not removed, and thus the cluster size and the pore area proportion could not be measured.

INDUSTRIAL APPLICABILITY

According to the present invention, it is possible to provide an optical laminate with controlled visible light transmittance and infrared light transmittance and a preparation method therefor in which the optical laminate can be prepared with a large area in a simple preparing process and in which there is no limitation on the type of a substrate on which a thermochromic layer is formed.

The invention claimed is:

1. An optical laminate comprising:
a substrate; and
a thermochromic layer formed on the substrate wherein the thermochromic layer includes a photo-sintered vanadium oxide cluster,
wherein
the vanadium oxide cluster has a size of 20 to 250 nm,
the optical laminate has maximum transmittance of 50% or more in a range of 400 to 800 nm, and
the thermochromic layer satisfies Equation 1 below:

$$1 \leq S(\%) \leq 20 \quad \text{[Equation 1]}$$

where S is a pore area proportion measured by analyzing a picture obtained by a picture analysis apparatus capturing an upper surface of a sample.

2. The optical laminate according to claim 1, wherein the thermochromic layer has a thickness of 0.1 to 5 μm.

3. The optical laminate according to claim 1, wherein the laminate has the minimum transmittance of 70% or less in the range of 2000 to 3000 nm at any temperature higher than or equal to a critical temperature.

4. The optical laminate according to claim 1, wherein the laminate satisfies conditions of Equation 2 below:

$$BP_{min} - OP_{min} \geq 10\%, \quad \text{[Equation 2]}$$

where $BP_{min}$ is the minimum transmittance in the range of 2000 to 3000 nm at any temperature lower than or equal to a critical temperature, and $OP_{min}$ is the minimum transmittance in the range of 2000 to 3000 nm at any temperature higher than or equal to the critical temperature.

5. The optical laminate according to claim 1, wherein the substrate is a glass, quartz, or polymer film.

6. The optical laminate according to claim 5, wherein the polymer film contains a polymer with a glass transition temperature of 70° C. or higher.

7. The optical laminate according to claim 5, wherein the polymer film is stretched about one or more axes and has a shrinkage proportion of less than 3% when exposed at 120° C. for one hour.

* * * * *